United States Patent
Musungu et al.

(10) Patent No.: US 7,123,430 B2
(45) Date of Patent: Oct. 17, 2006

(54) METHOD AND APPARATUS FOR PROVIDING WRITE PRE-COMPENSATION USING A READ TIMING PATH

(75) Inventors: Firmin M. Musungu, Rochester, MN (US); Joey M. Poss, Rochester, MN (US); Raymond A. Richetta, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/122,519

(22) Filed: May 5, 2005

(65) Prior Publication Data

US 2005/0200996 A1     Sep. 15, 2005

Related U.S. Application Data

(62) Division of application No. 10/787,308, filed on Feb. 26, 2004.

(51) Int. Cl.
*G11B 5/09*     (2006.01)
*G11B 5/02*     (2006.01)

(52) U.S. Cl. .............................. 360/51; 360/45; 360/68
(58) Field of Classification Search ..................... None
See application file for complete search history.

(56) References Cited

U.S. PATENT DOCUMENTS

| | | | |
|---|---|---|---|
| 4,885,645 A | 12/1989 | Hashimoto | |
| 5,359,631 A | 10/1994 | Behrens et al. | |
| 5,805,024 A * | 9/1998 | Takashi et al. | ............... 331/17 |
| 5,872,665 A | 2/1999 | Millican et al. | |
| 5,986,830 A | 11/1999 | Hein | |
| 6,091,558 A | 7/2000 | Voorman et al. | |
| 6,134,691 A | 10/2000 | Hirasaka | |
| 6,337,778 B1 * | 1/2002 | Gagne | .......................... 360/51 |
| 6,369,661 B1 | 4/2002 | Scott et al. | |
| 6,426,662 B1 | 7/2002 | Arcus | |
| 2002/0015247 A1 | 2/2002 | Rosky et al. | |

* cited by examiner

Primary Examiner—Wayne Young
Assistant Examiner—Daniell L. Negrón
(74) Attorney, Agent, or Firm—David W. Lynch; Chambliss, Bahner & Stophel P.C.

(57) ABSTRACT

A method and apparatus for providing write pre-compensation using a read timing path is disclosed. The present invention generates a first phase clock signal having a first phase and being synchronized with a read signal of a read path, generates a second phase clock signal having a second phase at a predetermined phase difference with the first clock signal and uses the first and second clock signals to shift write data to achieve write data comprising a first desired pre-compensation.

3 Claims, 12 Drawing Sheets

METHOD AND APPARATUS FOR PROVIDING WRITE PRE-COMPENSATION USING A READ TIMING PATH

RELATED PATENT DOCUMENTS

This application is a divisional of U.S. patent application Ser. No. 10/787,308, filed on Feb. 26, 2004 (HSJ920030200US1), to which priority is claimed under 35 U.S.C. § 120, and which is incorporated herein by reference. This application is related to the following co-pending and commonly-assigned patent application, which is hereby incorporated herein by reference in its respective entirety:

"METHOD AND APPARATUS FOR PROVIDING GENERALIZED WRITE PRE-COMPENSATION" to Musungu et al., U.S. patent application Ser. No. 10/787,291 (HSJ920030197US1/HITG.060PA).

BACKGROUND OF THE INVENTION

1. Field of the Invention

This invention relates in general to data processing, and more particularly to a method and apparatus for a method and apparatus for providing write pre-compensation using a read timing path.

2. Description of Related Art

Recently developed data storage devices, such as magnetic disk drive devices (i.e., hard disk drives), have increased storage capacity and increased data access speed. With these advantages, magnetic disk drive devices have become widely used as auxiliary memory devices for computer systems. More generally, developments in pulse communications related to these improvements in disk drive technology have recently provided increased speed and reliability in a wide range of pulse communications systems. The present invention will be described in detail in the context of magnetic disk drive devices, but persons skilled in the pulse communications arts will readily apprehend that this invention provides an improved method for data pulse detection in a wide variety of pulse communication contexts.

The primary features of a magnetic disk drive device that affect storage capacity and access speed are the head, the recording medium, the servo mechanism, the signal processing technique used in the read/write channel, and the like. Among these, signal processing techniques utilizing PRML (Partial Response Maximum Likelihood) detection have greatly contributed to the increased storage capacities and high access speeds seen in modern magnetic disk drive devices.

A read channel circuit in a generic read/write channel circuit of a magnetic disk drive device includes components for initial processing of the analog read signal generated by the read/write head of the device. This processing provides automatic gain control (AGC) amplification, filtering, and equalization, as well as analog-to-digital conversion.

In a magnetic disk or tape data storage device, data is commonly stored on a magnetic medium by saturation recording in which each portion of the medium is magnetized to the point of saturation in one of two directions. The data to be stored is typically encoded to satisfy certain constraints and the encoded data is used to modulate the direction of magnetization. In a coded representation known as NRZI, each "one" bit of the encoded data causes a transition in the direction of magnetization, while each "zero" bit of the encoded data causes the magnetization direction to remain unchanged. A clock signal is used to write a sequence of encoded NRZI bits as a recording head moves along a track on the medium such that one bit is written at each clock tick. In NRZ, there are no neutral or rest condition, such as a zero amplitude in amplitude modulation (AM), zero phase shift in phase-shift keying (PSK), or mid-frequency in frequency-shift keying (FSK). Note: For a given data signaling rate, i.e., bit rate, the NRZ code requires only one-half the bandwidth required by Manchester coding. With NRZ coding, 1's may be used to indicate magnet polarity change of, while 0's may be used to indicate no change in polarity change.

When a read head is passed over the recorded data track, a voltage pulse is produced at each transition in magnetization. Successive voltage pulses have opposite polarity since successive magnetic transitions are in opposite directions. The written NRZI data sequence may be reconstructed from the resulting voltage waveform by associating a "one" bit with every clock tick at which a pulse occurs and a "zero" bit with every clock tick at which no pulse occurs. The original user data may then be decoded from the NRZI data.

To recover the written or transmitted data sequence, the receiver requires a clock signal synchronized with the received waveform. At each tick of this synchronized clock signal the receiver or read circuitry generates one bit of the NRZI data sequence by processing the surrounding waveform. It is often impossible or at least undesirable to store or transmit a separate synchronized clock signal with the data waveform. Instead, constraints are applied to the encoded NRZI data sequence to ensure that timing information may be extracted from the data waveform itself and used to "recover" a synchronized clock signal. Such a system is referred to as "self clocking".

Nonlinear bit shift (NLBS) in magnetic recording is the shift in position of a written transition due to the proximity effect of a preceding transition. In PRML, the readback waveform is synchronously sampled at regular intervals. Sample values depend on the position of written transitions. Therefore an unwanted shift, such as a nonlinear bit shift, leads to error in sample values that, in turn, degrades the performance of the PRML channel.

Write pre-compensation is a method to shift the write data timing in a direction to aid in pre-equalizing the signal. This optimizes the eventual readback signal; i.e., write signal modified based on prediction of what write signal will produce the cleanest readback signal using an understanding of physical/magnetic properties, i.e., predicting effects of distortion from bits before/after that location before writing data on magnetic media. As bits are written on a disk media, close bits can partially erase each other as unwanted signal timing shift. Write pre-compensation can aid in fixing this problem. The media bits may require substantial amounts of write pre-compensation based on adjacent bits. Even if bits are two or three bits apart (1 0 0 1), the partial erasure influence could be significant enough to affect read back performance.

However, known methods for measuring the NLBS and adjusting the write pre-compensation add complexity to the PRML channel. Today's high-density recording demands require greater flexibility in write pre-compensation. Currently, write pre-compensation methods rely on a stand-alone circuit that requires extra design time.

It can be seen then that there is a need for pre-compensation that utilizes existing circuits for read signal processing and minimizes design time, but provides effective write pre-compensation using a read timing path.

SUMMARY OF THE INVENTION

To overcome the limitations in the prior art described above, and to overcome other limitations that will become apparent upon reading and understanding the present specification, the present invention discloses a method and apparatus for providing write pre-compensation using a read timing path.

The present invention solves the above-described problems by generating a first phase clock signal having a first phase and being synchronized with a read signal of a read path, generating a second phase clock signal having a second phase at a predetermined phase difference with the first clock signal and using the first and second clock signals to shift write data to achieve write data comprising a first desired pre-compensation.

A system in accordance with the principles of the present invention includes a first phase clock source for generating a first clock signal having a first phase and being synchronized with a read signal of the read path, a second phase clock source for generating a second clock signal having a second phase at a predetermined phase difference with the first clock signal and a write pre-compensation circuit for using the first and second clock signals to shift write data to achieve write data comprising a first desired pre-compensation.

In another embodiment of the present invention a magnetic storage device is provided. The magnetic storage device includes a magnetic storage medium for recording data thereon, a motor for moving the magnetic storage medium, a head for reading and writing data on the magnetic storage medium, an actuator for positioning the head relative to the magnetic storage medium and a data channel for processing encoded signals on the magnetic storage medium, the data channel comprising a first phase clock source for generating a first clock signal having a first phase and being synchronized with a read signal of the read path, a second phase clock source for generating a second clock signal having a second phase at a predetermined phase difference with the first clock signal and a write pre-compensation circuit for using the first and second clock signals to shift write data to achieve write data comprising a first desired pre-compensation.

In another embodiment of the present invention a method for providing write pre-compensation utilizing read signal timing is provided. The method includes generating a first phase clock signal having a first phase and being synchronized with a read signal of a read path, generating a second phase clock signal having a second phase at a predetermined phase difference with the first clock signal and using the first and second clock signals to shift write data to achieve write data comprising a first desired pre-compensation.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing write pre-compensation using a read timing path. The present invention generates a first phase clock signal having a first phase and being synchronized with a read signal of a read path, generates a second phase clock signal having a second phase at a predetermined phase difference with the first clock signal and uses the first and second clock signals to shift write data to achieve write data comprising a first desired pre-compensation.

Figure 1:
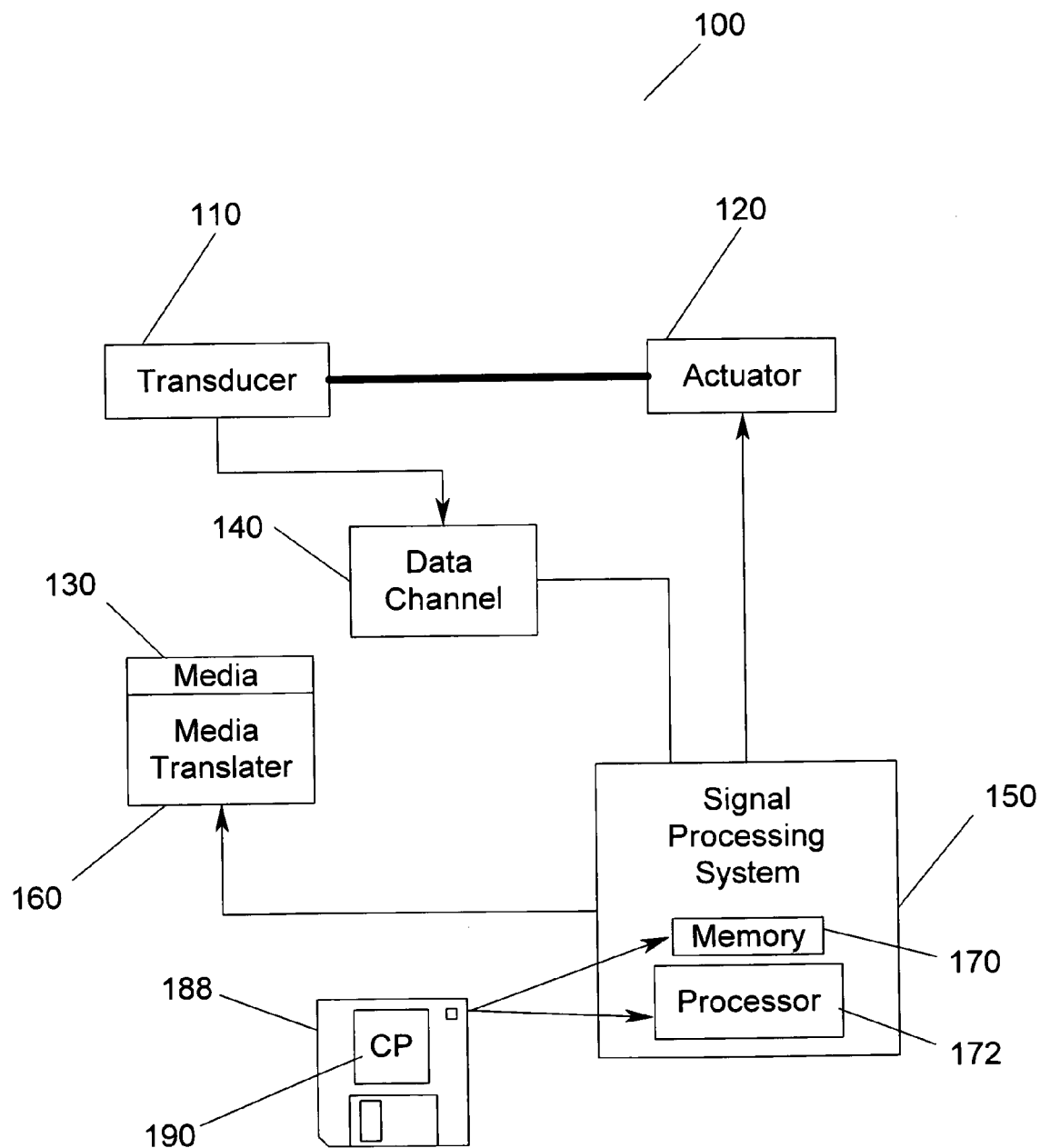
FIG. 1 illustrates a storage system according to an embodiment of the present invention.

FIG. 1 illustrates a storage system 100 according to an embodiment of the present invention. In FIG. 1, a transducer 110 is under control of an actuator 120. The actuator 120 controls the position of the transducer 110. The transducer 110 writes and reads data on magnetic media 130. The read/write signals are passed to a data channel 140. A signal processor system 150 controls the actuator 120 and processes the signals of the data channel 140. In addition, a media translator 160 is controlled by the signal processor system 150 to cause the magnetic media 130 to move relative to the transducer 110. Nevertheless, the present invention is not meant to be limited to a particular type of storage system 100 or to the type of media 130 used in the storage system 100.

Figure 2:
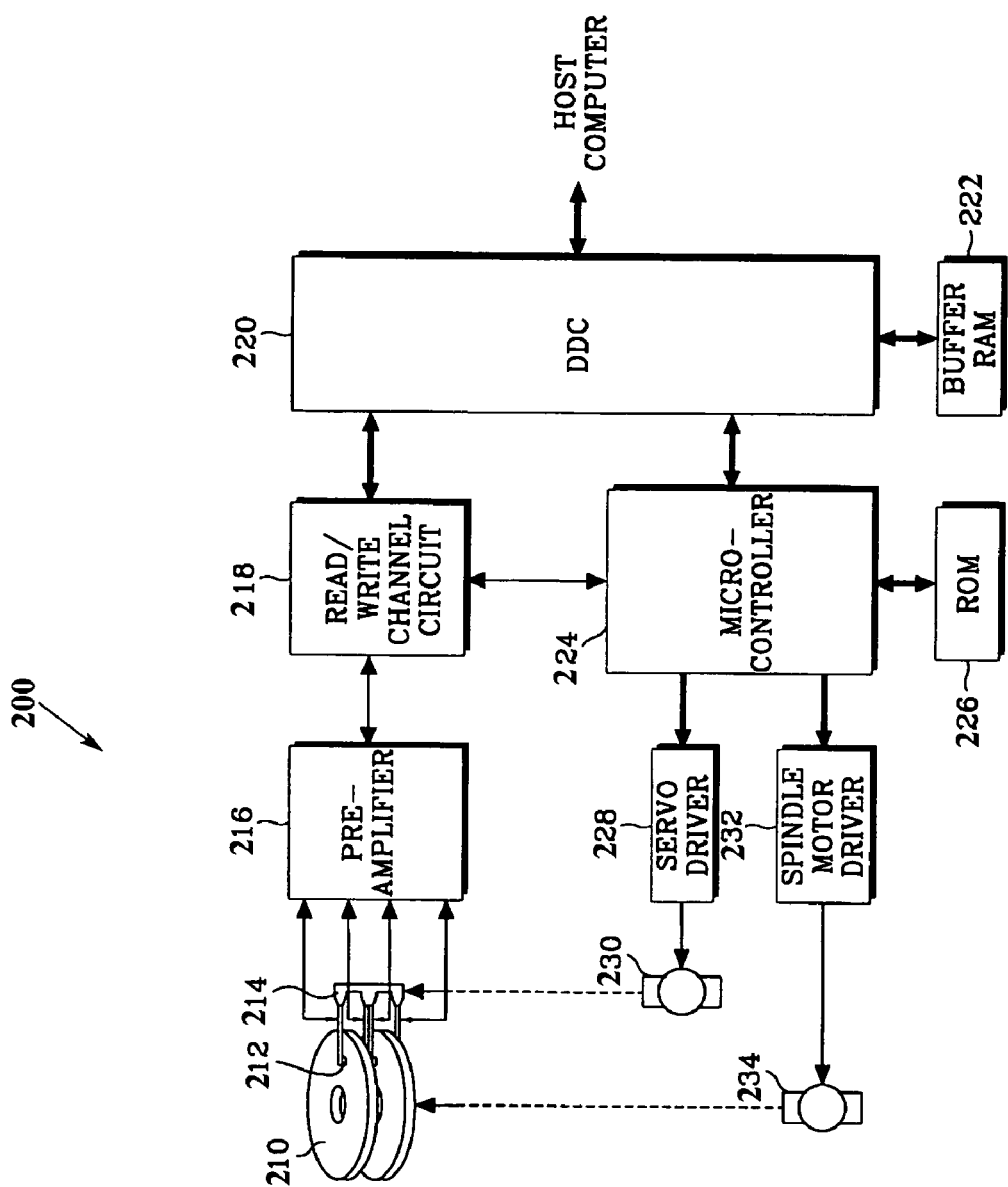
FIG. 2 is a block diagram of a magnetic disk drive device according to an embodiment of the present invention.

FIG. 2 is a block diagram of a magnetic disk drive device 200 according to an embodiment of the present invention. In FIG. 2, disks 210 are rotated by a spindle motor 234, and heads 212 are positioned at surfaces of corresponding ones of disks 210. Heads 212 are mounted on corresponding servo arms that extend from an E-shaped block assembly 214 to disks 210. Block assembly 214 has an associated rotary voice coil actuator 230 that moves block assembly 214 and thereby changes to positions of heads 212 for reading data from or writing data to a specified position on one or more of disks 210.

A pre-amplifier 216 pre-amplifies a signal picked up by heads 212 and thereby provides read/write channel circuit 218 with an amplified signal during a reading operation. During a write operation, pre-amplifier 216 transfers an encoded write data signal from the read/write channel circuit 218 to heads 212. In a read operation, read/write channel circuit 218 detects a data pulse from a read signal provided by pre-amplifier 216 and decodes the data pulse. Read/write channel circuit 218 transfers the decoded data pulse to a disk data controller (DDC) 20. Furthermore, read/write channel circuit 218 also decodes write data received from the DDC 220 and provides the decoded data to pre-amplifier 216.

DDC 220 both writes data received from a host computer (not shown) onto disks 210, through read/write channel circuit 218 and pre-amplifier 216, and transfers read data from disks 210 to the host computer. DDC 220 also interfaces between the host computer and a microcontroller 224. A buffer RAM (Random Access Memory) 222 temporarily stores data transferred between DDC 220 and the host computer, microcontroller 224, and read/write channel circuit 218. Microcontroller 224 controls track seeking and track following functions in response to read and write commands from the host computer.

A ROM (Read Only Memory) 226 stores a control program for microcontroller 224 as well as various setting values. A servo driver 228 generates a driving current for driving actuator 230 in response to a control signal, generated from microcontroller 224 that provides control of the position of heads 212. The driving current is applied to a voice coil of actuator 230. Actuator 230 positions heads 212 relative to disks 210 in accordance with the direction and amount of the driving current supplied from servo driver 228. A spindle motor driver 232 drives spindle motor 234, which rotates disks 210, in accordance with a control value generated from microcontroller 224 for controlling disks 210.

Figure 3:
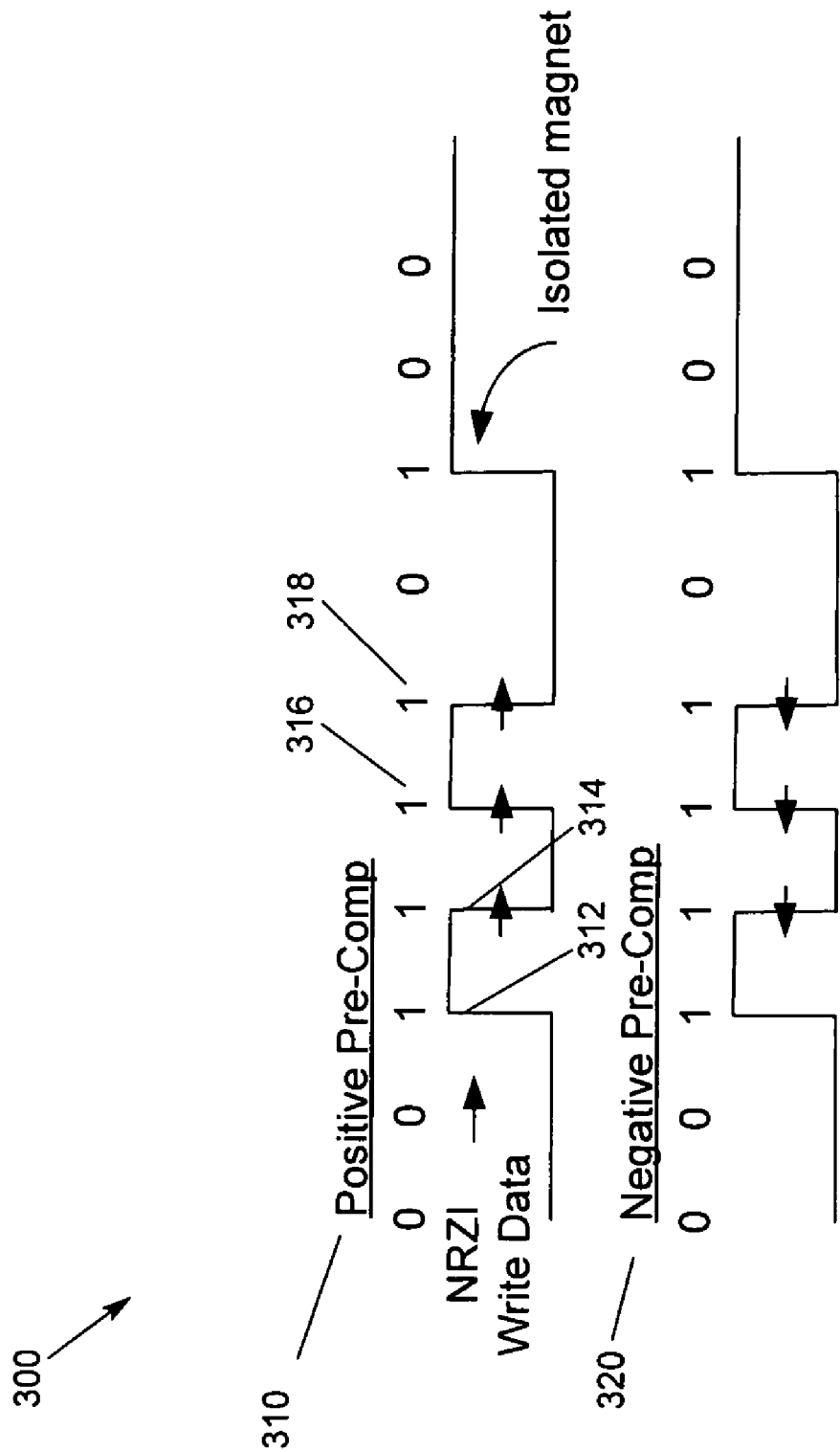
FIG. 3 illustrates write pre-compensation for the write data.

FIG. 3 illustrates write pre-compensation 300 for the write data according to an embodiment of the present invention. Write pre-compensation is a method to shift the write data timing in a direction to aid in pre-equalizing the signal. As bits are written on a disk media, close bits can partially erase each other as unwanted signal timing shift. Write pre-compensation can aid in fixing this problem. Positive pre-compensation is defined as time shifting a pre-determined sequence of bits in a positive direction relative to an isolated magnet. In FIG. 3, positive pre-compensation 310 and negative pre-compensation 320 is shown.

For example, for the positive pre-compensation 310, four magnetic "ones" 312–318 are written in a row and the last three "ones" 314–318 are time shifted to the right a certain amount. Negative pre-compensation 320 is similar but in the opposite direction. Current horizontal recoding technology has shown positive pre-compensation to be beneficial, where current perpendicular recording technology has shown negative pre-compensation to be beneficial. A one-length magnet pre-compensation amount of 0 to +/−30% with a 1% to 2% accuracy may be required.

Figure 4:
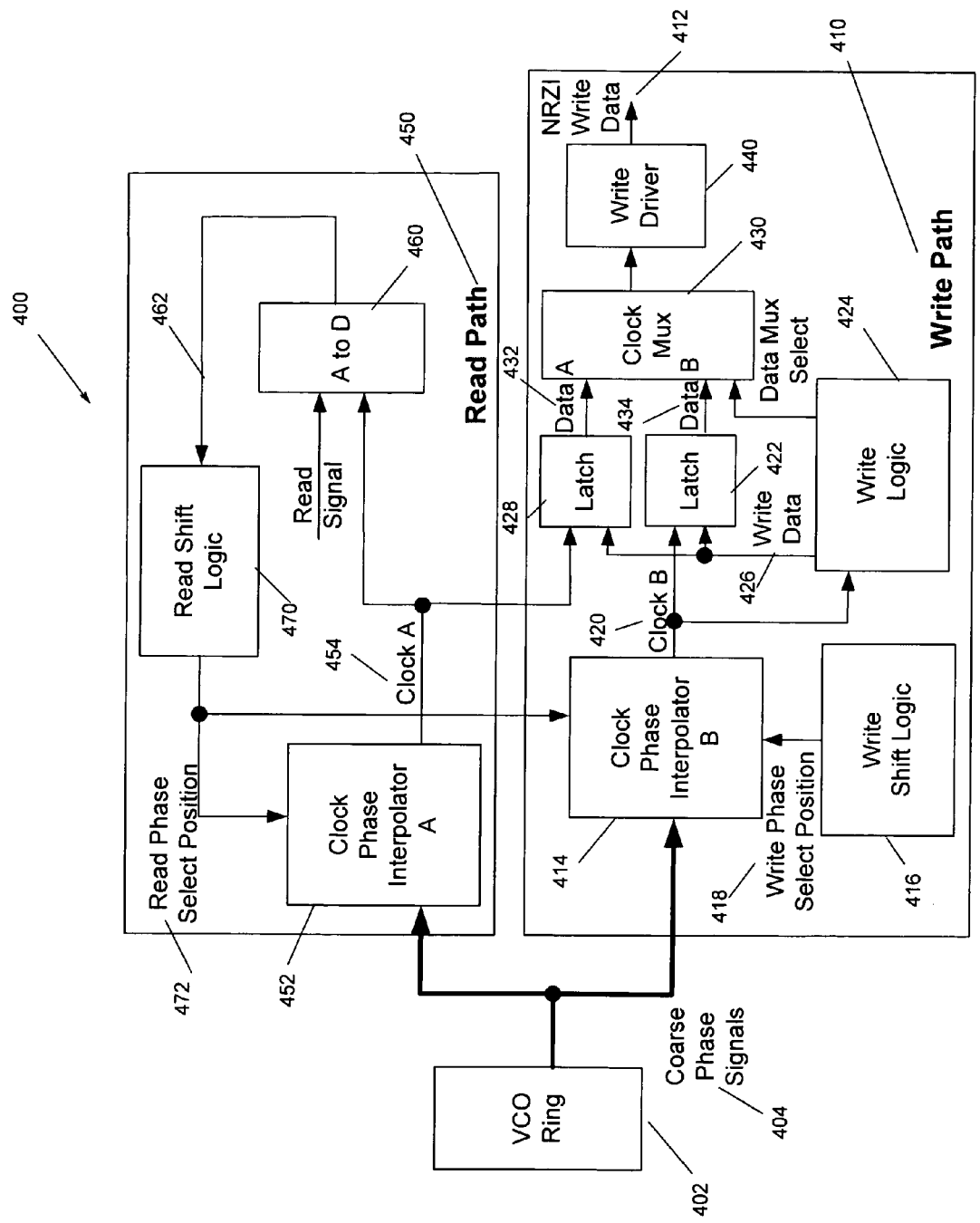
FIG. 4 is a block diagram of the write and read paths with write pre-compensation according to an embodiment of the present invention.

FIG. 4 is a block diagram 400 of the write 410 and read 450 paths with write pre-compensation according to an embodiment of the present invention. The NRZI Write Data 412 is pre-compensated using read and write path circuitry. The read path 450 includes a first clock phase interpolator 452 that receives the coarse phase signals 404 from the voltage-controlled oscillator (VCO) ring 402 and provides a clock signal 454 to the analog-to-digital converter 460. The analog-to-digital converter 460 provides a signal 462 to the read shift logic 470 to provide read phase select position signal 472 to the first clock phase interpolator 452. During a read operation the first clock phase interpolator 452 is used to track follow the data signal to provide synchronous clock and data to the data channel system using an A/D converter 460 and read shift logic 470. Thus, synchronous timing is provided by the first clock phase interpolator 452.

In the write path 410, the coarse phase signals 404 are provided to a second clock phase interpolator 414. Write shift logic 416 provides a write phase select position 418 to the second clock phase interpolator 414. The second clock phase interpolator 414 provides a second clock 420 to a first latch 422 and to write logic 424. The write logic 424 provides write data 426 to the first latch 422 and to a second latch 428. The second latch 428 is controlled by the clock signal 454 from the first clock phase interpolator 452 shown in the read path 450. By making an identical copy of the clock phase interpolator 452 and with a fixed shift difference amount, two clocks with a precision phase shift can be obtained to accomplish the write pre-compensation operation. During a write operation the second clock phase interpolator 414 is used with the first clock phase interpolator 452 to provide the two clocks 420, 454 for write pre-compensation. Clock A 454 and Clock B 420 latch the write data 426 and a Clock Mux 430 determines which of the Data A 432 or Data B 434 paths are selected to feed the write driver 440. The advantages of this scheme are: precise, non-calibrated, write pre-compensation delay amounts; re-utilization of existing read circuits minimizing design time; and supplying either positive on negative pre-compensation amounts.

Clock phase interpolators 452, 412 are used to generate different amounts of pre-compensation with adequate accuracy. As bits are written on a disk media, close bits can partially erase each other as unwanted signal timing shift. Write pre-compensation that provide one-length bit pre-compensation amount of 0 to +/−30% with 1% to 2% accuracy may be required.

Figure 5:
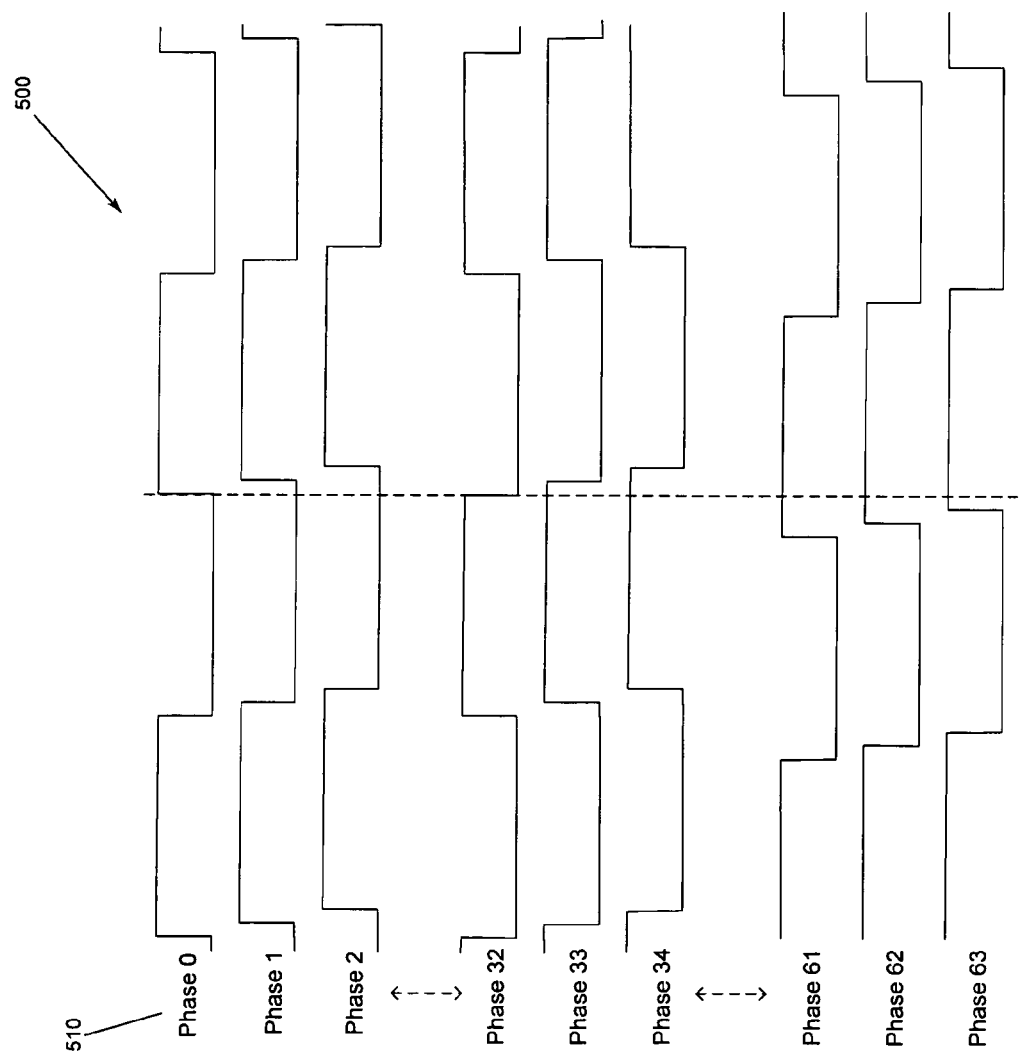
FIG. 5 shows some of the possible clock phases generated out of the clock phase interpolator according to an embodiment of the present invention.

FIG. 5 shows some of the possible clock phases 500 generated out of the clock phase interpolator according to an embodiment of the present invention. For the read signal path the first clock phase interpolator needs to generate accurate phase increments for the whole clock period. The delay stages from a ring VCO can generate coarse phases. A 4-stage differential VCO ring design can generate 8 different phases 45 degrees apart. As an example, the clock phase interpolator may use these 8 different phases to generate 54 different phases 510 at 5.625 degrees apart.

Figure 6:
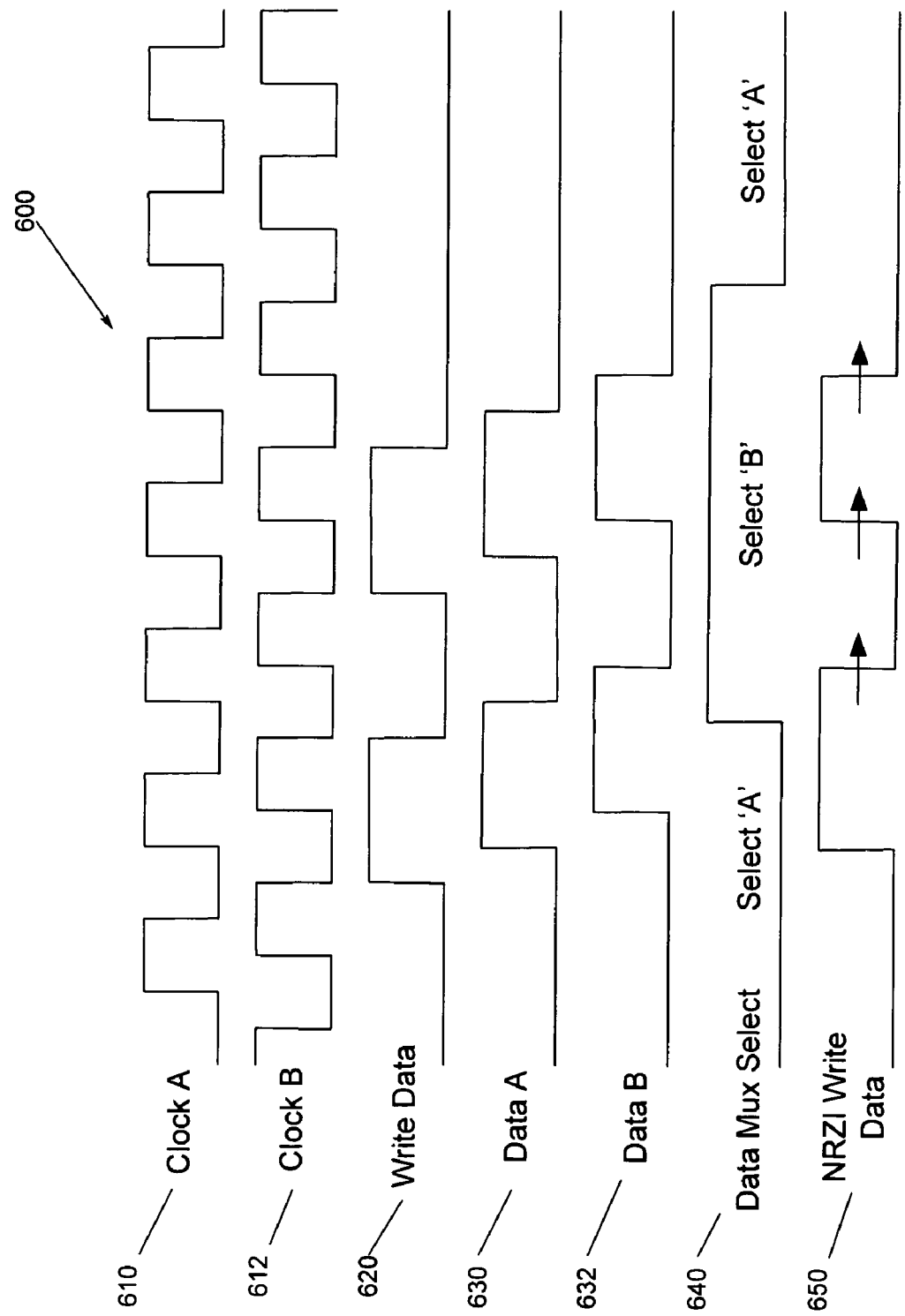
FIG. 6 shows the positive pre-compensation timing according to an embodiment of the present invention.

FIG. 6 shows the positive pre-compensation timing 600 according to an embodiment of the present invention. In FIG. 6, two identical Clock Phase Interpolators, i.e., Clock A 610 and Clock B 612, are generated. The amount of pre-compensation may be selected by selecting the phase difference between the clock phase interpolators. Write Data 620 is generated from the user and is latched by Clock A 610 and Clock B 612 resulting in Data A 630 and Data B 632. In order to pre-compensate the magnet, Data Mux Select 640 is enabled and in this case when Data Mux Select 640 is at a high level, Clock B 632 is selected out of the Clock Mux, which causes the magnet to shift to the right thereby providing positive pre-compensation and resulting in NRZI Write Data 650. Negative pre-compensation is provide in a similiar way.

Figure 7:
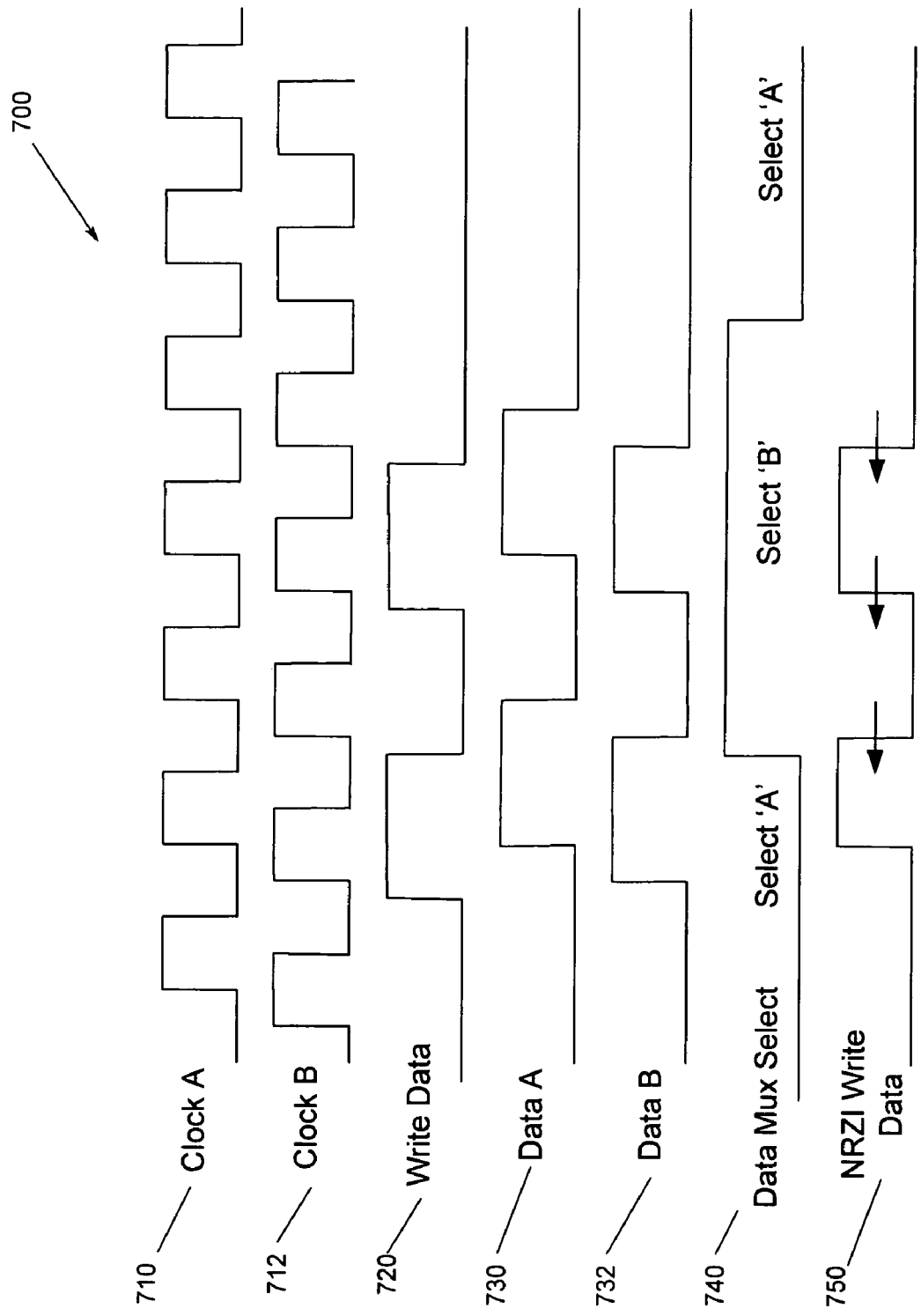
FIG. 7 shows B shifted to the left of Clock A with the result of the NRZI Write Data providing negative pre-compensation according to an embodiment of the present invention.

FIG. 7 shows the negative pre-compensation timing 700 according to an embodiment of the present invention. FIG. 7 shows B shifted to the left of Clock A with the result of the NRZI Write Data providing negative pre-compensation. In FIG. 7, two identical Clock Phase Interpolators, i.e., Clock A 710 and Clock B 712, are generated. The amount of pre-compensation may be selected by selecting the phase difference between the clock phase interpolators. Write Data 720 is generated from the user and is latched by Clock A 710 and Clock B 712 resulting in Data A 730 and Data B 732. In order to pre-compensate the magnet, Data Mux Select 740 is enabled and in this case when Data Mux Select 740 is at a high level, Clock B 732 is selected out of the Clock Mux, which causes the magnet to shift to the left providing negative pre-compensation and resulting in NRZI Write Data 750.

Because the write pre-compensation circuit also utilizes the first clock phase interpolator in the read path, the first clock phase interpolator in the read path will rotate or change positions during the read operation. Typically the step sizes are small being less than 5% of the period during the read operation. In order to keep the same amount of pre-compensation, the second clock phase interpolator needs to follow the first clock phase interpolator during a read operation because the write operation will quickly follow the read operation and there is not enough time to reset the clock phase interpolators and move large phase step movements of larger than 10%. Clock phase interpolators movements of 30% are usually done in small increments of 6.25% per step in 5 steps will give a total movement of 31.25%.

Figure 8:
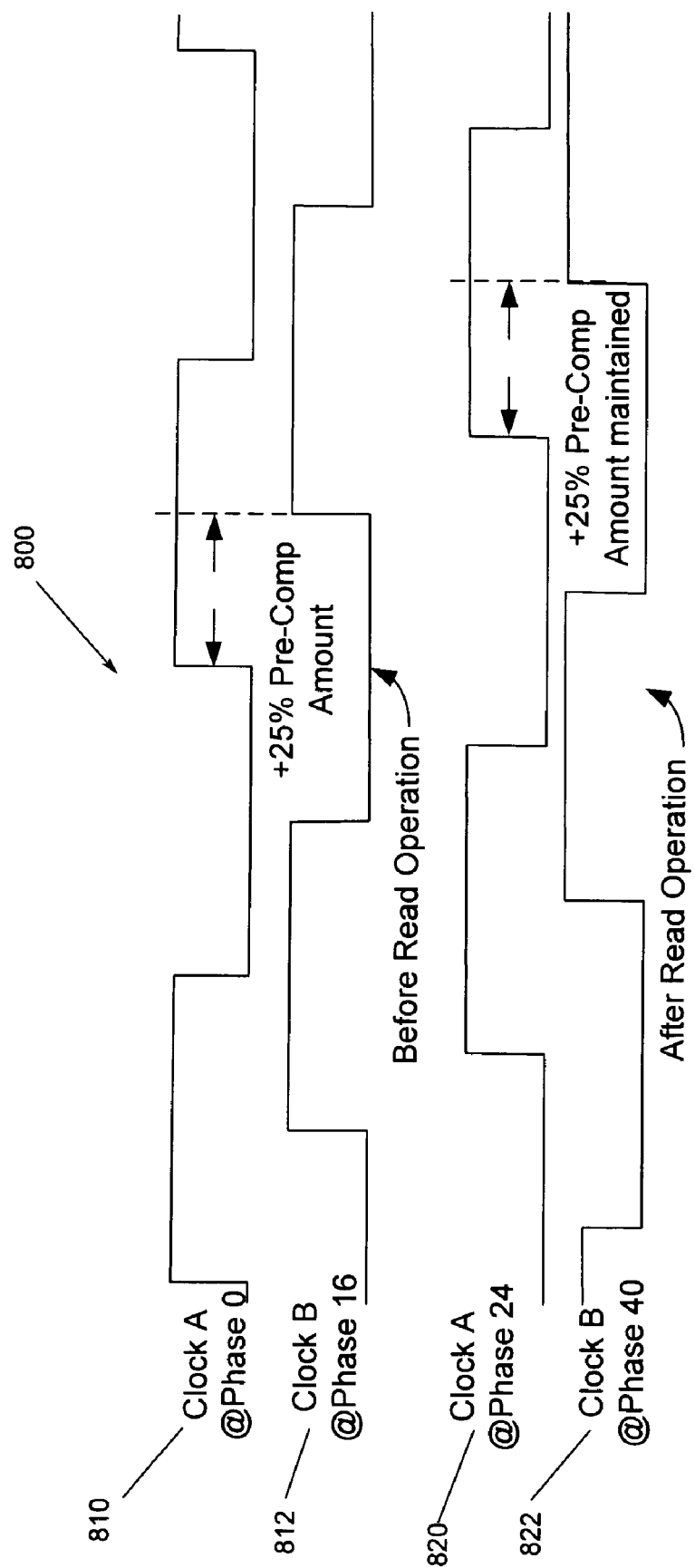
FIG. 8 illustrates clock phases according to an embodiment of the present invention.

FIG. 8 illustrates clock phases 800 according to an embodiment of the present invention. In FIG. 8, before the read operation starts, Clock A is at phase position 0 810 and Clock B is at phase position 16 812. After the read operation, Clock A will move to some arbitrary position and hold. In this example the Clock A stopped at phase position 24 820 and Clock B stopped at phase position 40 822. The phase difference is maintained at 16 for both cases to provide +25% pre-compensation.

Figure 9:
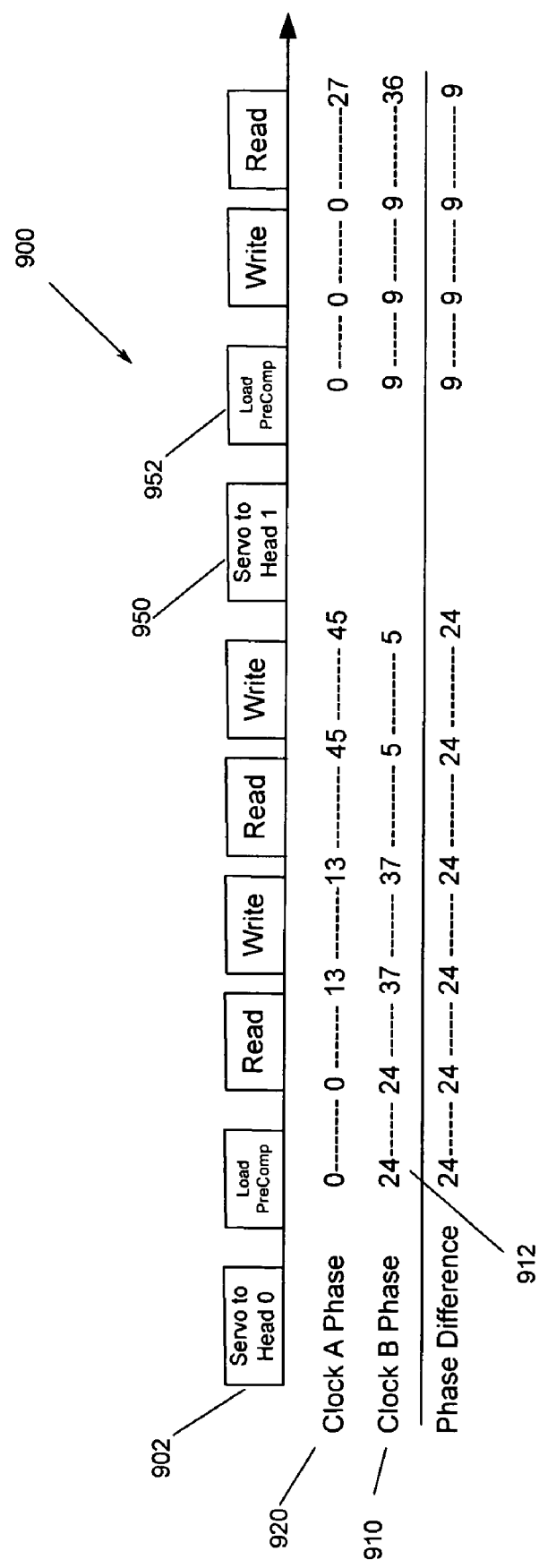
FIG. 9 illustrates write pre-compensation being maintained after read operations according to an embodiment of the present invention.

FIG. 9 illustrates write pre-compensation being maintained after read operations 900 according to an embodiment of the present invention. In FIG. 9, the head is positioned to the correct track and usually a read operation is performed followed by more read operations or write operations. According to an embodiment of the present invention, before a read or write is done, the first clock phase interpolator and second clock phase interpolator are set at a difference to load pre-compensation. In this example of FIG. 9, Clock B 910 is set at 24 phase positions 912 after Clock A 920 for Head 0 902. This difference is maintained for all the read or write operations for Head 0 902. Switching to another head may require a new pre-compensation amount and so subsequently after Head 1 950 is chosen the load pre-compensation 952 can be done again before the next read or write operation. The key is to maintain the correct phase difference between Clock A phase and Clock B phase regardless the disk drive operation.

Figure 10:
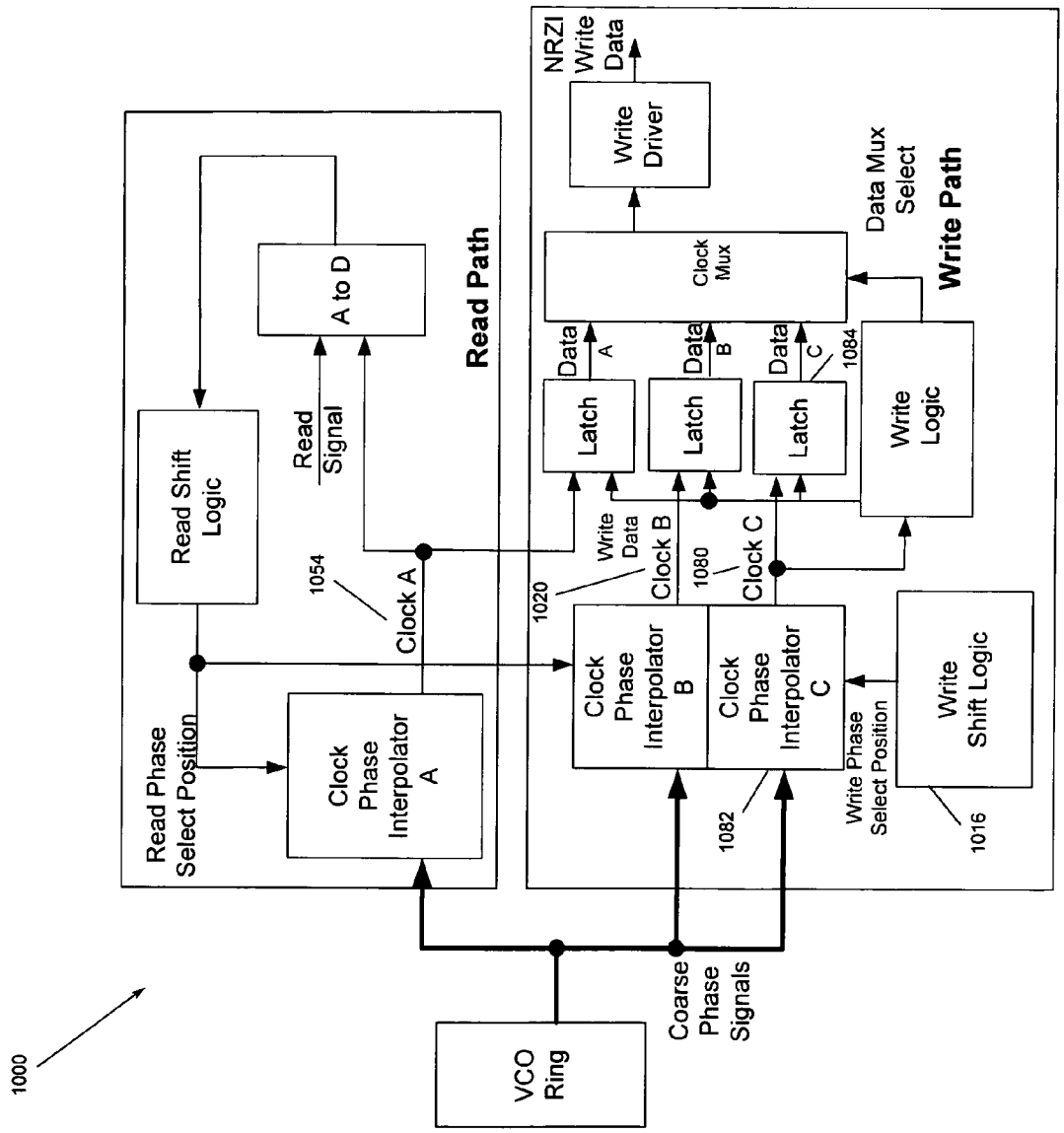
FIG. 10 is a block diagram of a circuit for providing extended pre-compensation utilizing read signal timing according to an embodiment of the present invention.

Alternative embodiments of the present invention may also be configured to provide additional states in pre-compensation. FIG. 10 is a block diagram 1000 of a circuit for providing extended pre-compensation utilizing read signal timing according to an embodiment of the present invention. As shown in FIG. 10, instead of having only two pre-compensation states available from Clock A 1054 and Clock B 1020, an additional Clock C 1080 can be added as in FIG. 10. Therefore, a third clock phase interpolator 1082 and third latch 1084 are provided. In FIG. 10, the third clock phase interpolator 1082 that provides the clock signal to the write logic 1016. Clock C 1080 can then be used for an additional pre-compensation state.

Figure 11:
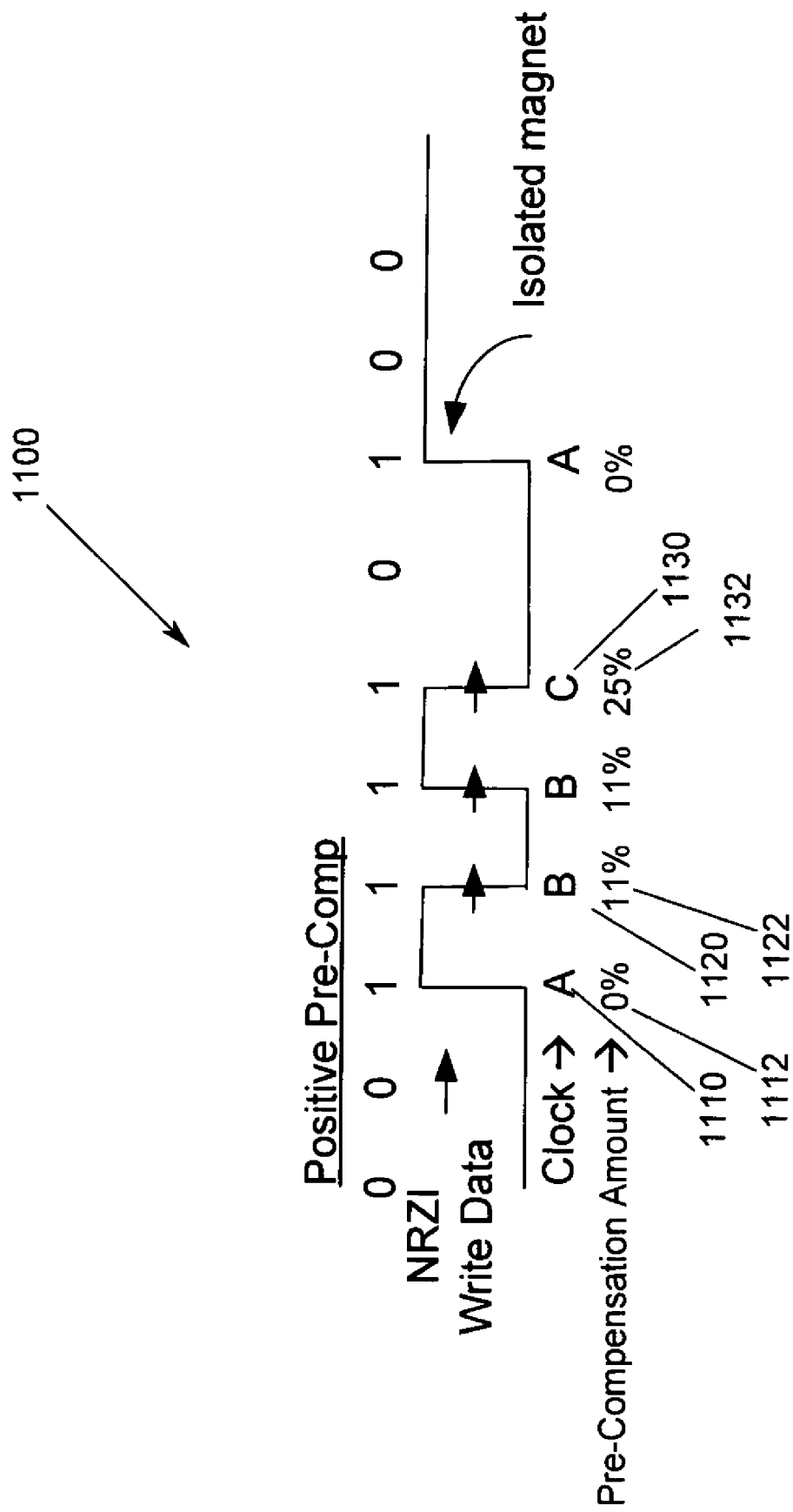
FIG. 11 shows an example of how a 3 state pre-compensation might be used according to an embodiment of the present invention.

FIG. 11 shows an example of how a 3 state pre-compensation might be used 1100 according to an embodiment of the present invention. As shown in FIG. 11, Clock A 1110 provide 0% write pre-compensation 1112, Clock B 1120 provides 11% write pre-compensation 1122 and Clock C 1130 provides 25% write pre-compensation 1132.

Figure 12:
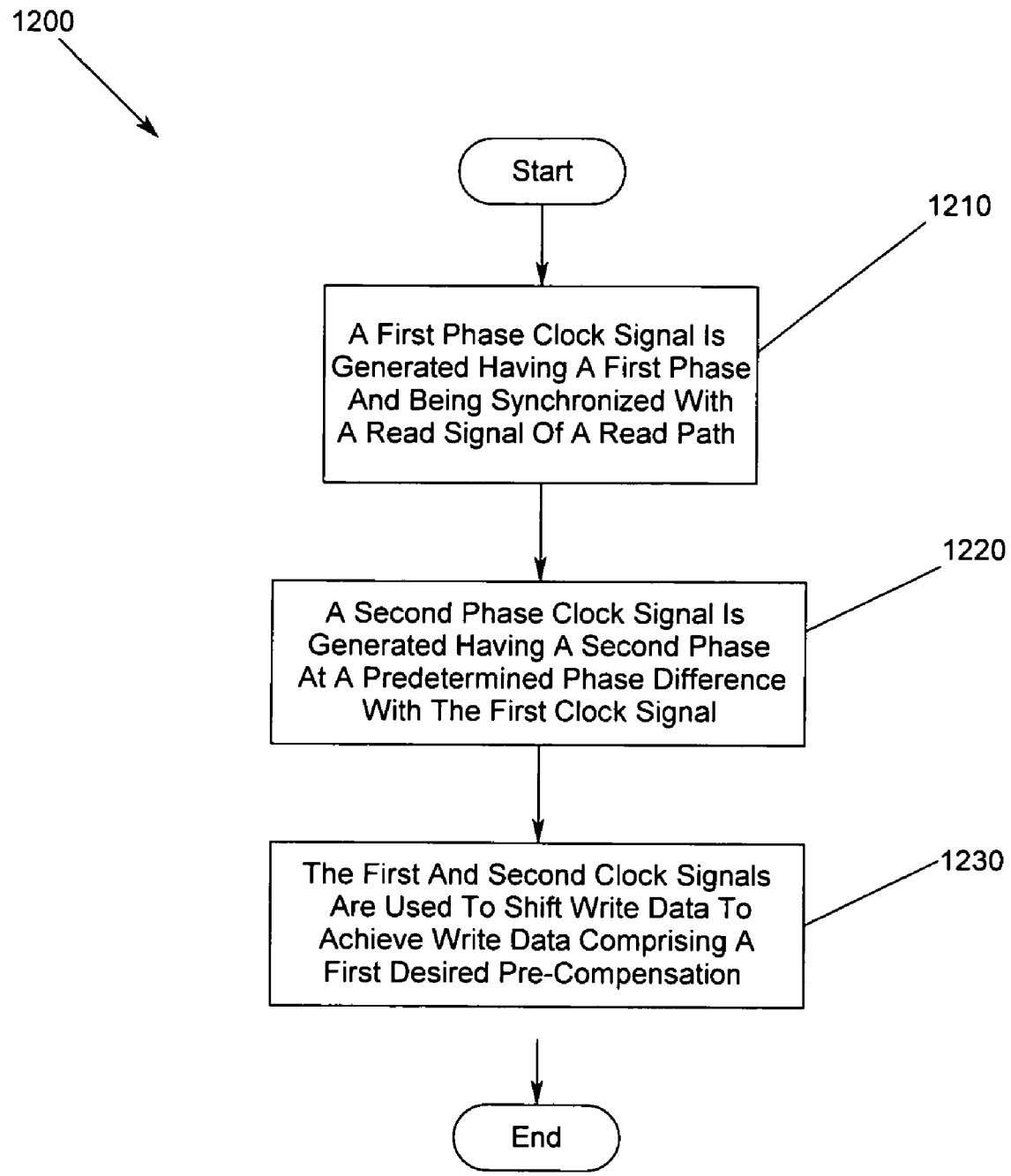
FIG. 12 is a flow chart of the method for providing write pre-compensation using a read timing path according to an embodiment of the present invention.

FIG. 12 is a flow chart 1200 of the method for providing write pre-compensation using a read timing path according to an embodiment of the present invention. In FIG. 12, a first phase clock signal is generated having a first phase and being synchronized with a read signal of a read path 1210. A second phase clock signal is generated having a second phase at a predetermined phase difference with the first clock signal 1220. The first and second clock signals are used to shift write data to achieve write data comprising a first desired pre-compensation 1230.

The process illustrated with reference to FIGS. 1–12 may be tangibly embodied in a computer-readable medium or carrier, e.g. one or more of the fixed and/or removable data storage devices 188 illustrated in FIG. 1, or other data storage or data communications devices. The computer program 190 may be loaded into memory 170 to configure the processor 172 for execution of the computer program 190. The computer program 190 include instructions which, when read and executed by a processor 172 of FIG. 1, causes the devices to perform the steps necessary to execute the steps or elements of an embodiment of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A circuit for providing write pre-compensation utilizing read signal timing, comprising:
    a first phase clock source for generating a first clock signal having a first phase and being synchronized with a read signal of a read path;
    a second phase clock source for generating a second clock signal having a second phase at a predetermined phase difference with the first clock signal;
    a write pre-compensation circuit for using the first and second clock signals to shift write data to achieve write data comprising a first desired pre-compensation; and
    at least one additional phase clock source, the at least one additional phase clock source providing at least one additional pre-compensation state.

2. A magnetic storage device, comprising:
    a magnetic storage medium for recording data thereon;
    a motor for moving the magnetic storage medium;
    a head for reading and writing data on the magnetic storage medium;

an actuator for positioning the head relative to the magnetic storage medium; and a data channel for processing encoded signals on the magnetic storage medium, the data channel comprising a first phase clock source for generating a first clock signal having a first phase and being synchronized with a read signal of a read path, a second phase clock source for generating a second clock signal having a second phase at a predetermined phase difference with the first clock signal, a write pre-compensation circuit for using the first and second clock signals to shift write data to achieve write data comprising a first desired pre-compensation and at least one additional phase clock source, the at least one additional phase clock source providing at least one additional pre-compensation state.

3. A method for providing write pre-compensation utilizing read signal timing, comprising:

generating a first phase clock signal having a first phase and being synchronized with a read signal of a read path;

generating a second phase clock signal having a second phase at a predetermined phase difference with the first clock signal;

using the first and second clock signals to shift write data to achieve write data comprising a first desired pre-compensation; and generating at least one additional phase clock signal for providing at least one additional pre-compensation state.

* * * * *